United States Patent Office 2,891,995
Patented June 23, 1959

2,891,995
STEROID INTERMEDIATES AND SYNTHESIS THEREOF

William S. Johnson, Madison, Wis., assignor to Wisconsin Alumni Research Foundation, Madison, Wis., a corporation of Wisconsin No Drawing. Application July 7, 1958
Serial No. 746,654

13 Claims. (Cl. 260—586)

The present invention relates to the steroid field. More specifically, the invention is directed to improved processes and resulting products having particular utility in the synthesis of non-aromatic steroids as set forth by the communication of W. S. Johnson et al. in J. Am. Chem. Soc. 75, 2275 (1953).

The process starts with 5-lower alkoxy-2-tetralone. This product may be prepared from 1,6-di-(lower alkoxy) naphthalene in accordance with the process described by J. W. Cornforth and R. Robinson in J. Chem. Soc. 1855 (1949). The synthesis proceeds in accordance with the flow sheets set forth below.

In the formulas of the flow sheet R represents an aliphatic group of low molecular weight, i.e., one having from 1 to about 8 carbon atoms. Preferred groups are lower alkyl groups such as methyl, ethyl, propyl, isopropyl, butyl, and the like, although the alkyl groups can, if desired, contain substituents inert to the reagents employed, such as hydroxy or alkoxy, so that R also can be a group such as 2-hydroxyethyl, 2,3-dihydroxypropyl, 2-methoxyethyl, 2-ethoxyethyl and the like.

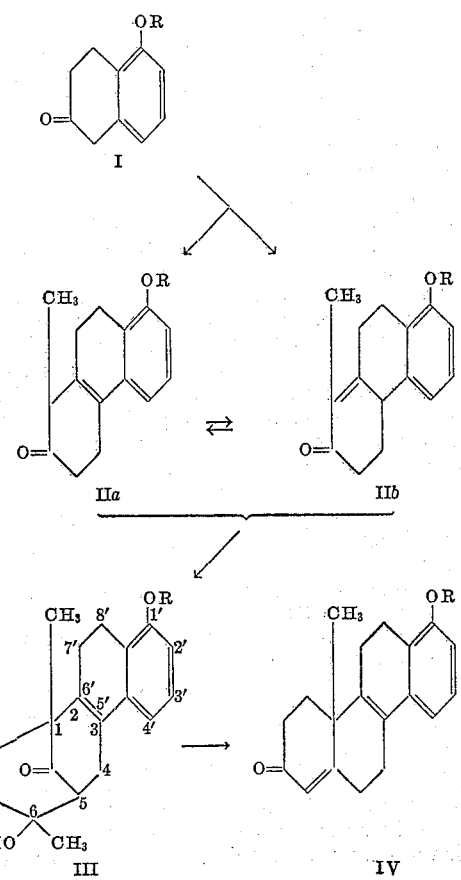

The 5-lower alkoxy-2-tetralone (I) is reacted with an ethyl vinyl ketone, $CH_3CH_2COCH=CH_2$, or its chemical equivalent, a 1-(di-lower alkylamino)-3-pentanone methiodide, $CH_3CH_2COCH_2CH_2\text{-}N(\text{lower alkyl})_2 \cdot CH_3I$, in the presence of a strong alkaline condensing agent under anhydrous conditions. The 1-(di-lower alkylamino)-3-pentanone, so-called "Mannich base," is prepared by conventional methods from a ketone, $CH_3CH_2COCH_3$, formaldehyde and a dialkylamine, and is then quaternized with methyl iodide before being used in the process of the invention. The Mannich base methiodide under alkaline conditions is believed to decompose to produce the ethyl vinyl ketone in situ; hence the former is the full chemical equivalent of the latter for the purposes of the present invention.

The product of the reaction of the 5-lower alkoxy-2-tetralone (I) with an ethyl vinyl ketone or Mannich base methiodide is a tautomeric mixture of the isomeric tricyclic ketones (IIa and IIb), 1-$CH_3$-2-keto-8-lower alkoxy-1,2,3,4,9,10-hexahydrophenanthrene and 1-$CH_3$-2-keto-8-lower alkoxy-2,3,4,4a,9,10-hexahydrophenanthrene. Generally the isomer IIa is the one formed in larger quantities and is the one which takes part in the subsequent step.

The hydroxy ketone (III), 1,6-dimethyl-6-hydroxy-9-oxo-2,3-(1'-lower alkoxy-7',8'-dihydro-6',5'-naphtho)-$\Delta^2$-bicyclo-[3.3.1]nonene, is prepared by reacting the tricyclic ketone IIa or a mixture of the isomers IIa and IIb with methyl vinyl ketone or its chemical equivalent, a 1-(di-lower alkylamino)-3-butanone methiodide in the presence of a strong alkaline condensing agent under anhydrous conditions.

If the tetracyclic hydroxy ketone III is heated with a strong base under anhydrous conditions, the tetracyclic unsaturated ketone (IV), 1-lower alkoxy-8-keto-10a-methyl-5,6,8,9,10,10a,11,12-octahydrochrysene is produced.

The tetracyclic ketone IV (R=lower alkyl) can be obtained directly from the 5-lower alkoxy-2-tetralone without isolation of intermediates by successive addition of the appropriate reagents followed by heating the reaction mixture to effect conversion of the hydroxy ketone III to the tetracyclic ketone IV.

It was originally believed that the hydroxy ketone III (R=$CH_3$) was a chrysene derivative of the formula

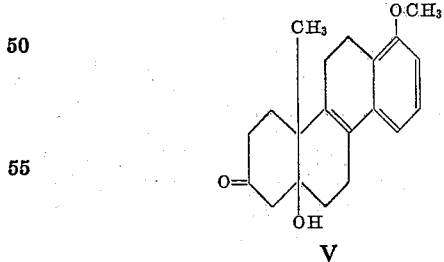

which is the expected aldolization product from the reaction of the Mannich base on the tricyclic ketone II. It was discovered, however, that the structure V was incompatible with the chemical and physical properties of the hydroxy ketone. The hydroxy ketone was subjected to the following series of reactions: the oxo group was reduced to a hydroxy group, and the resulting diol was monoacetylated with acetic anhydride in pyridine. The diol monoacetate was then subjected to dehydration with phosphorus oxychloride and saponified to give an unsaturated alcohol. If structure V were correct for the original hydroxy ketone then the unsaturated alcohol would have the following structure VI:

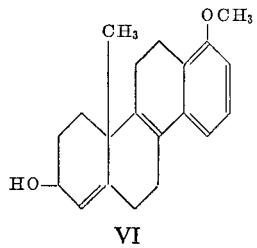

VI

The structure VI should readily be oxidized with chromic oxide in pyridine to the ketone IV. However, when the unsaturated alcohol was so oxidized a compound was obtained which gave no evidence of an $\alpha,\beta$-unsaturated ketone structure in its ultraviolet spectrum, and was obviously different from the ketone IV. It was concluded, therefore, that either a rearrangement had occurred during dehydration or the originally assigned structure for the hydroxy ketone III was in error. The latter conclusion was confirmed by nuclear magnetic resonance spectra which showed the presence of four methyl groups in the acetate of the hydroxy ketone. This is in conformity with structure III, the acetate of which contains four methyl groups, whereas the acetate of structure V contains only three methyl groups.

The structure III arises from an alternative route for ring closure involving aldolization of the methylene group at the 3-position of the tricyclic ketone II with the oxo group of the methyl vinyl ketone, giving rise to a bridged ring ketol.

The conversion of the hydroxy ketone III to the tetracyclic ketone IV in the presence of a strong base involves a reverse-aldol reaction whereby the bridged ring is cleaved between positions 5 and 6, and the transient intermediate tricyclic ketone with a 3-oxobutyl side chain then undergoes cyclodehydration to the ketone IV. The structure of the ketone IV was, of course, proved by its ultimate conversion to known steroids.

*1-methoxy-7-keto-8 - methylhexahydrophenanthrene (II, R=CH₃) reaction of 5 - methoxy - 2 - tetralone (I, R=CH₃) with 1-diethylamino-3-pentanone methiodide*

The following operations were conducted under strictly anhydrous conditions. To a chilled (ice bath) solution of 221 g. of 1-diethyl-amino-3-pentanone in 750 ml. of dry thiophene-free benzene was added slowly, with stirring, 219 g. of dry methyl iodide over a period of 1 hour. Stirring was continued with cooling for 4 hours; then the mixture was allowed to stand for about 18 hours at 0°. The pasty methiodide was dissolved by the addition of 350 ml. of anhydrous methanol and while still cold this solution was employed in the reaction described below.

A 5-liter, 3-necked, round-bottomed flask was fitted with a rubber-sealed wire stirrer, a pressure-equalized Hershberg dropping funnel, and a reflux condenser which was connected at the top through a 3-way stopcock to a source of vacuum and dry nitrogen. The system was evacuated, flame-dried, and dry nitrogen was admitted. The flask was then charged with 1150 ml. of anhydrous methanol, and 48.5 g. of sodium was added slowly. After the sodium was dissolved, a solution of 248 g. of 5-methoxy-2-tetralone I in 550 ml. of dry thiopene-free benzene was placed in the dropping funnel. The system was evacuated until the solvent began to boil, then filled with dry nitrogen, the process being repeated once to insure the removal of air. The ketone solution was then added rapidly to the stirred sodium methoxide solution with cooling (ice bath). The dropping funnel was next charged (in an escaping stream of nitrogen) with cold solution of the Mannich base methiodide prepared as described above. The methiodide solution was then added over a period of 140 minutes with stirring and cooling to 2–5° C. Stirring was continued for 3.5 hours; then the ice bath was replaced by a heating mantle and the mixture was boiled under reflux for 1 hour. The mixture was cooled, acidified with 1600 ml. of 2 N sulfuric acid, diluted with 1 liter of water, and stirred thoroughly. The aqueous layer was then separated, and extracted with three portions of ether. The combined ether and benzene solutions were washed thoroughly with saturated salt solution; then the solvent was removed by distillation under reduced pressure. The residual oil was distilled through a 12 x 2 cm. Vigreux column with a short air condenser to yield the following fractions: (1) B.P. 60–140° C. (0.8–1.3 mm.), 27.6 g. consisting mainly of recovered 5-methoxy-2-tetralone; (2) B.P. 140–158° C. (1.2–1.3 mm.), 11.3 g. containing some of the tricyclic ketone II; (3) B.P. 158–203° C. (mostly at 200° C.) (0.6 mm.), 218 g. of the tricyclic ketone IIa and IIb. Fraction (3) was a pale green oil which mostly solidified on seeding with the solid isomer described below. A sample of the mixture of tricyclic ketones produced in another run boiling at 155–188° C. (0.88–0.2 mm.) showed $\lambda$ max. 222 m$\mu$ (log E 4.40), 255 (414), $\lambda$ min. 242 (4.09).

*Analysis.*—Calcd. for $C_{16}H_{18}O_2$: C, 79.31; H, 7.49. Found: C, 79.55; H, 7.81.

A sample of tricyclic ketone, B.P. 190–195° C. (0.25 mm.) prepared as described above was crystallized from 100 ml. of ethanol. The colorless product melted at 90–95° C. Recrystallization from ethanol gave colorless prisms of 1-methyl-2-keto-8-methoxy-1,2,3,4,9,10-hexahydrophenanthrene (IIa), M.P. 96.5–97° C. $\lambda$ max. 222 m$\mu$ (log E 4.41), 267 (4.08), $\lambda$ min. 243 (3.72).

*Analysis.*—Calcd. for $C_{16}H_{18}O_2$: C, 79.31; H, 7.49. Found: C, 78.94; H, 7.55.

*1-methoxy-8-keto-10a-methyl-5,6,8,9,10,10a,11,12-octahydrochrysene (IV, R=CH₃)*

A solution of the Mannich base methiodide was prepared from 38.3 g. of 1-diethylamino-3-pentanone and 38.0 g. of methyl iodide. The procedure was essentially the same as described above except that ether (150 ml.) was used as the solvent and 0.5 ml. of benzyl alcohol was added to catalyze the quaternary salt formation. After reaction was complete, the ether was removed under reduced pressure and the crystalline salt dissolved in 61 ml. of anhydrous methanol( dried over magnesium methoxide). This solution was employed in a condensation with 45.0 g. of 5-methoxy-2- tetralone. The procedure described above was followed except that anhydrous methanol was employed as the solvent, 95 ml. being used to dissolve the tetralone, and 200 ml. for the dissolution of the sodium (8.40 g.). After the addition of the methiodide was complete (140–170 minutes), the solution was stirred for 2 hours in the cold, then 1 hour with the cooling bath removed, and finally was boiled under reflux for 2 hours. The mixture was cooled, a solution of 7.85 g. of sodium in 200 ml. of anhydrous methanol was added rapidly (under nitrogen), and then a solution of 26.9 g. of dry methyl vinyl ketone in 175 ml. of anhydrous methanol was dropped in slowly over a period of 2 hours with stirring and cooling to 2–5° C. During this period the hydroxy ketone III began to precipitate. After standing at room temperature for 18 hours the mixture was cooled to 15° C., 50 ml. of acetic acid was added and the colorless crystalline product was separated by filtration. This product consisted of the crude hydroxy ketone III contaminated with unsaturated ketone IV, which was undoubtedly present in varying amounts depending on the run as the melting point was found to vary between values as low as 169–172° C. (presumably mostly unsaturated ketone) up to about 200° C. Such material, however, was entirely satisfactory for the preparation of pure unsaturated ketone. Additional crude hydroxy ketone can be obtained by working up the filtrate as described in another experiment below.

When distilled tricyclic ketone II (203 g.) was employed in the condensation with methyl vinyl ketone (88.2 g.) and sodium methoxide (from 14.4 g. of sodium) as described above, 142 g. of crude hydroxy ketone III was obtained in the first crop. The filtrate was evaporated under reduced pressure, sufficient water added to dissolve the sodium acetate and the mixture extracted with benzene. The benzene layer was evaporated under reduced pressure and the gummy residue triturated with ether and allowed to stand overnight. In this way an additional 30 g. of colorless crystalline crude hydroxy ketone was obtained.

The unsaturated ketone IV was easily obtained from the crude hydroxy ketone as follows. The 30.0 g. of first crop material obtained without isolation of the tricyclic ketone (see above) was treated with a solution of 3.5 g. of sodium in 500 ml. of methanol. After refluxing for 4 hours under an atmosphere of nitrogen, the mixture was chilled and 9.5 ml. of acetic acid was added. The colorless product was separated by filtration, washed with ether followed by water and dried in a vacuum oven at 100° C. the tetracyclic ketone IV was obtained with a M.P. of 174–175° C.

A sample of the tetracyclic ketone purified by sublimation at 170° C. (0.05 mm.) followed by recrystallization from ethanol was obtained as colorless rhombs, M.P. 174.2–175.2° C., λ max. 227 mµ (log E 4.57).

Analysis.—Calcd. for $C_{20}H_{22}O_2$: C, 81.59; H, 7.53. Found: C, 81.48; H, 7.61.

The semicarbazone crystallized from ethanol as colorless short rods, M.P. 246–249° C. (dec.) with darkening at 237° C., λ max. 223.5 mµ (log E 4.47), 271 (4.62), λ min. 242 (4.21).

Analysis.—Calcd. for $C_{21}H_{25}O_2N_3$: C, 71.77; H, 7.17. Found: C, 71.55; H, 7.30.

The alternative preparation of the tetracyclic ketone IV by the use of the Mannich base methiodide was carried out as follows. The Mannich base methiodide was prepared from 15.3 g. of 1-diethylamino-3-butanone in 50 ml. of benzene and 16.4 g. of methyl iodide under essentially the same conditions as described above for the higher homolog. After standing for 90 hours in the refrigerator the solvent was removed through a sintered glass filter disk and the residual salt was washed with dry ether. The methiodide was dissolved in 50 ml. of methanol and 50 ml. of benzene, and this solution was employed in condensation with 26.15 g. of distilled tricyclic ketone mixture (dissolved in 220 ml. of benzene) in the presence of a solution of 3.73 g. of sodium in 110 ml. of methanol. The procedure was essentially the same as that described above for the condensation of the Mannich base methiodide with 5-methoxy-2-tetralone. The addition time for the methiodide was 2 hours, stirring was continued for 1 hour in the cold, then the mixture was refluxed for 25 minutes, cooled, and acidified with 200 ml. of 2 N sulfuric acid. The orange benzene layer was separated, and the aqueous layer extracted with benzene. The combined benzene solutions were washed thoroughly with water, and concentrated under reduced pressure. The orange solid residue was crystallized from 100 ml. of n-butyl acetate to give the tetracyclic ketone IV, M.P. 169–172.5° C.

*1,6 - dimethyl - 6 - hydroxy - 9 - oxo - 2,3 - (1' - methoxy - 7',8' - dihydro - 6',5' - naphtho) - Δ² - bicyclo - [3.3.1]nonene (III, R=CH₃)*

To a solution of 3.304 g. of crystalline tricyclic ketone IIa, M.P. 95–96° C. in 50 ml. of anhydrous methanol was added under nitrogen 10 ml. of 0.4 M sodium methoxide in methanol. The mixture was chilled to 0° and a cold solution of 2.10 g. of freshly distilled methyl vinyl ketone in 20 ml. of methanol was added rapidly with stirring. After standing for 2 hours in the cold and for 58 hours at room temperature, colorless crystals, M.P. 204–206° C., separated. Recrystallization from n-butyl acetate gave colorless prisms of III, M.P. 214–215.5° C. (vac.) λ max. 221 mµ (log E 4.42), 269 (4.06), λ min. 243 (3.69).

Analysis.—Calcd. for $C_{20}H_{24}O_3$: C, 76.89; H, 7.74. Found: C, 76.96; H, 7.77.

The acetate was prepared by treating 2.00 g. of the hydroxy ketone III with 2 ml. of acetyl chloride in 250 ml. of dry benzene. After refluxing for 12 hours, the mixture was washed thoroughly with 10% sodium carbonate solution, followed by saturated salt solution. On concentration and cooling 1.41 g. of the crude acetate, M.P. 137–142° C., separated. Two recrystallizations from alcohol gave colorless plates of the acetate of III, M.P. 144–145° C.

Analysis.—Calcd. for $C_{22}H_{26}O_4$: C, 74.55; H, 7.40. Found: C, 74.51; H, 7.21.

In the above detailed disclosure it will be understood that other di-lower alkylamino-3-pentanones and 3-butanones such as the dimethylamino and dipropylamino derivatives may be used in place of the diethylamino Mannich base methiodide employed. Also, following the general procedure employed in converting compound II to compounds III or IV with methyl vinyl ketone, ethyl vinyl ketone may be used in place of the Mannich base for converting compound I to compound II. In place of sodium methoxide employed in the above illustrative disclosure, other strong alkaline condensing agents may also be used as desired. Examples of suitable alkali metal condensing agents includes sodium amide, potassium amide, sodium hydride, potassium t-butoxide, sodium triphenyl methyl and the like.

This application is a continuation-in-part of copending Johnson application, Serial No. 597,899, filed July 16, 1956; Johnson application, Serial No. 424,505, filed April 20, 1954, now abandoned, and Johnson application, Serial No. 301,369, filed July 28, 1952, now abandoned.

I claim:
1. A 1-CH₃-2-keto-8-lower alkoxy-1,2,3,4,9,10-hexahydrophenanthrene having the formula

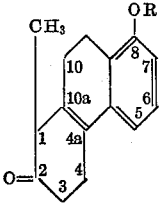

wherein R is a lower alkyl group.

2. The compound, 1-methyl-2-keto-8-methoxy-1,2,3, 4,9,10-hexahydrophenanthrene.

3. A 1,6-dimethyl-6-hydroxy-9-oxo-2,3-(1'-lower alkoxy-7',8'-dihydro - 6',5' - naphtho) - Δ² - bicyclo-[3.3.1]-nonene having the formula

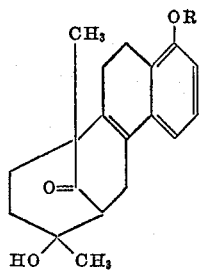

wherein R is a lower-alkyl group.

4. The compound, 1,6-dimethyl-6-hydroxy-9-oxo-2,3-(1'-methoxy-7',8'-dihydro - 6',5' - naphtho) - Δ² - bicyclo-[3.3.1]nonene.

5. A 1-lower alkoxy-8-keto-10a-methyl-5,6,8,9,10,10a,11,12-octahydrochrysene.

6. The compound, 1-methoxy-8-keto-10a-methyl-5,6,8,9,10,10a,11,12-octahydrochrysene.

7. The process of preparing a compound of claim 1 which comprises treating a 5-lower alkoxy-2-tetralene with a compound selected from the formulas $$CH_3CH_2COCH=CH_2$$

and $CH_3CH_2COCH_2CH_2N(\text{lower alkyl})_2 \cdot CH_3I$ in the presence of a strong alkaline condensing agent under anhydrous conditions.

8. The process for preparing a compound of claim 3 which comprises treating a tricyclic ketone of claim 1 with a member of the group consisting of a 1-(di-lower alkylamino)-3-butanone methiodide and methyl vinyl ketone in the presence of a strong alkaline condensing agent under anhydrous conditions.

9. The compounds represented by the following formula:

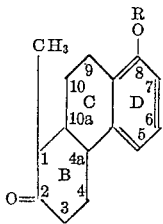

where R is a lower alkyl group and a double bond extends from the 10a position to an adjacent carbon atom in ring B.

10. The process of preparing a 1-methyl-2-keto-8-methoxy-hexahydrophenanthrene which comprises treating 5-methoxy-2-tetralone with 1-diethylamino-3-pentanone in the presence of a strong alkaline condensing agent under anhydrous conditions.

11. The process of preparing the tetracyclic ketone of claim 6, which comprises treating a tricyclic ketone of claim 9 where R is methyl with a member of the group consisting of 1-diethylamino-3-butanone and methyl vinyl ketone in the presence of a strong alkaline condensing agent under anhydrous conditions and then heating the resulting reaction mixture.

12. The process of converting the hydroxy ketone of claim 4 to the tetracyclic ketone of claim 6, which comprises heating the hydroxy ketone under anhydrous conditions in the presence of a strong base.

13. The process which comprises treating a 5-lower alkoxy-2-tetralone with a member of the group consisting of a di-lower-alkylamino-3-pentanone and ethyl vinyl ketone in the presence of a strong alkaline condensing agent under anhydrous conditions, treating the resulting tricyclic ketone with a member of the group consisting of a di-lower-alkylamino-3-butanone and methyl vinyl ketone in the presence of a strong alkaline condensing agent under anhydrous conditions, heating the resulting reaction mixture containing the hydroxy ketone and recovering the tetracyclic ketone 1-lower alkoxy-8-keto-10a-methyl-5,6,8,9,10,10a,11,12-octahydrochrysene therefrom.

References Cited in the file of this patent

UNITED STATES PATENTS

| | | |
|---|---|---|
| 2,542,223 | Wendler et al. | Feb. 20, 1951 |
| 2,671,808 | Johnston et al. | Mar. 9, 1954 |

OTHER REFERENCES

Cornforth et al.: J. Chem. Soc. (1949), pp. 1855–70.

Encyclopedia of Organic Chem. Elsevier (1949), vol. 13, 896–7.

Encyclopedia of Organic Chem. Elsevier (1951), vol. 14, 7S, 286S.